United States Patent [19]
Guymon

[11] Patent Number: 5,298,079
[45] Date of Patent: Mar. 29, 1994

[54] PROCESS FOR CLEANING USED OIL FILTERS

[76] Inventor: E. Park Guymon, 4085 Eccles Ave., Ogden, Utah 84403

[21] Appl. No.: 2,228

[22] Filed: Jan. 8, 1993

[51] Int. Cl.[5] .................. B01D 24/46; B01D 41/00; B08B 7/00; B30B 9/02
[52] U.S. Cl. .......................... 134/16; 134/10; 134/40; 134/42; 134/152; 134/166 R; 134/900; 100/37; 100/35; 100/102; 210/791; 210/797; 210/798; 252/174.21; 252/DIG. 1
[58] Field of Search .............. 134/16, 10, 40, 42, 134/152, 166 R, 900; 210/791, 797, 798; 100/37, 35, 102; 252/174.21, DIG. 1

[56] References Cited

U.S. PATENT DOCUMENTS

| | | | |
|---|---|---|---|
| 3,842,001 | 10/1974 | Keller | 210/799 |
| 4,645,608 | 2/1987 | Rayborn | 134/40 |
| 5,109,763 | 5/1992 | Morris et al. | 100/125 |

Primary Examiner—R. Bruce Breneman
Assistant Examiner—Zeinab El-Arini
Attorney, Agent, or Firm—J. Winslow Young

[57] ABSTRACT

A process for removing residual oil from used oil filters. The process includes washing the oil filters with a wash water while simultaneously crushing the oil filters. The wash water has a carefully selected and limited surfactant to effectively remove the residual oil while reducing emulsification of the removed residual oil into the wash water. The oil is recovered and the wash water is recirculated after having been amended with surfactant and/or water to assure that the surfactant remains within the desired limits.

15 Claims, 1 Drawing Sheet

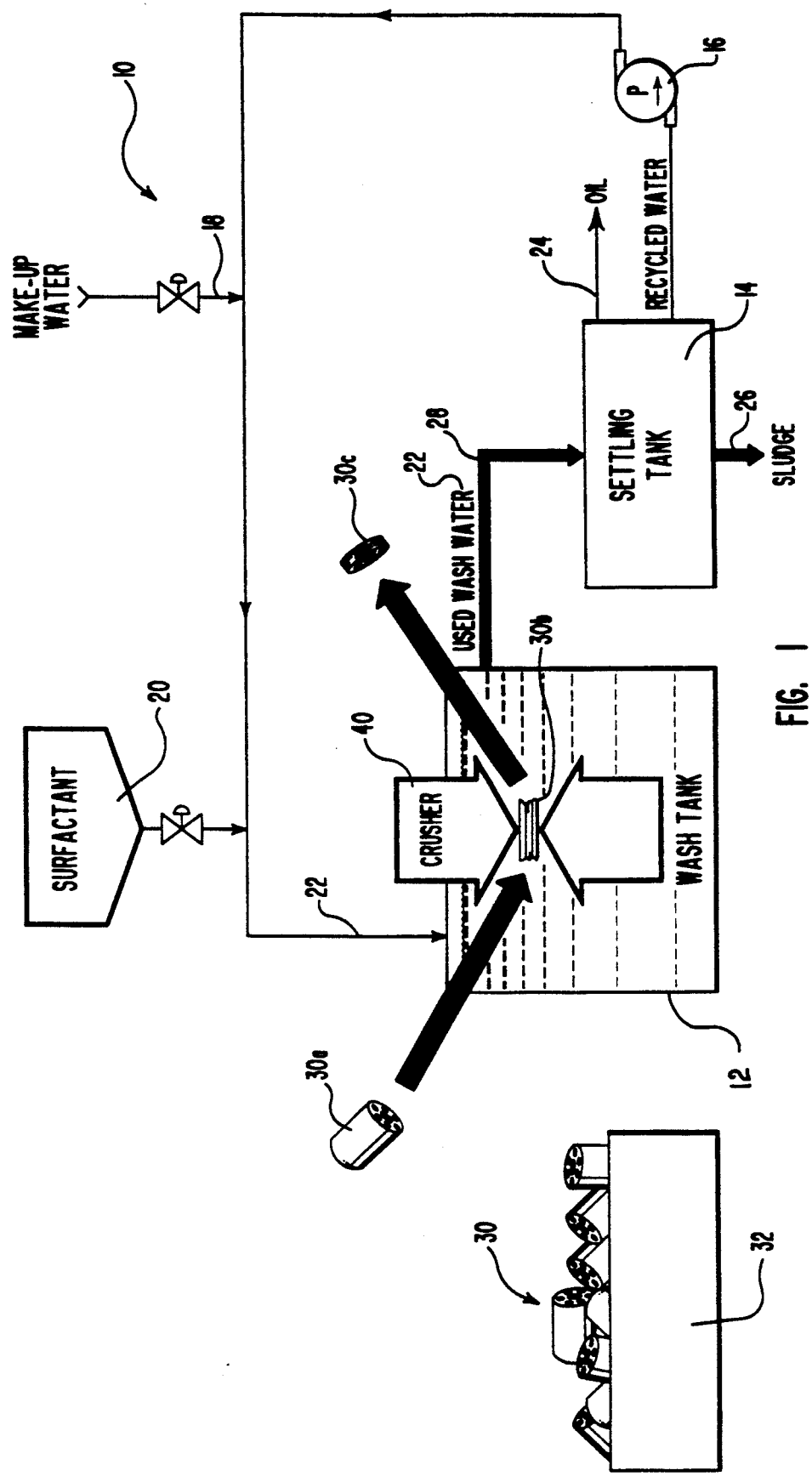

PROCESS FOR CLEANING USED OIL FILTERS

BACKGROUND

1. Field of the Invention

This invention relates to used oil filters and, more particularly, to a novel process for cleaning used oil filters so that the oil filters can be disposed of properly or, preferably, recycled into steel with the residual oil therein having been previously recovered and the wash water recycled through the novel cleaning process of this invention.

2. The Prior Art

An oil filter, as the name implies, is a device for removing particulate matter from a circulating lubrication oil to preclude the particulate matter from eroding the mechanical surfaces being lubricated by the oil. An oil filter is particularly important, for example, in the internal combustion engine of an automobile since the travel of an automobile exposes the bearing surfaces of the engine to numerous sources of potentially damaging particulate matter. The purpose of the oil filter, therefore, is to remove and trap all particulate matter above a certain microscopic size range. It is recommended that the oil filter for each automobile should be replaced every 3,000 to 6,000 miles of travel, depending upon the particular driving conditions for that automobile.

Customarily, the oil filter is changed each time the oil is drained and replaced with fresh oil. The used oil filter is drained of a substantial portion of the residual oil and then discarded. However, the disposal of used oil filters represents a significant waste disposal problem since even the small amount of residual oil will contaminate the soil and ground water in a landfill. Also many bearing surfaces are fabricated from a babbitt metal which includes tin, antimony, and copper so that the natural wear of these surfaces will release these metals and others such as chrome, etc., into the lubricating oil.

Given the millions of automobiles in the United States alone, one can readily determine that there are many millions of oil filters discarded annually. The recycled oil filter should be processed back into steel in a steel-making furnace if the problem of residual oil can be solved. Metal recyclers will not accept used oil filters since the oil filters contain residual oil and residual metal contaminants in both the oil and on the filter medium. Further, the presence of the filter media itself also imposes extra burden on the recycling system.

In view of the foregoing, it would be an advancement in the art to provide a process for cleaning used oil filters. It would also be an advancement in the art to provide a water-based process for cleaning used oil filters while recovering the oil cleaned therefrom and recycling the wash water. An even further advancement in the art would be to provide a novel oil filter cleaning process wherein dirt and other debris is recovered without contaminating the cleaning solution. An even further advancement in the art would be to provide a water-based wash system for removing residual oil from used oil filters wherein the wash system is particularly characterized by the absence of significant emulsification of the oil into the wash water. Such a novel process is disclosed and claimed herein.

BRIEF SUMMARY AND OBJECTS OF THE INVENTION

This invention is a novel process for using a water-based cleaning system for cleaning used oil filters without contaminating the water with either the oil or the solid contaminants trapped by the filter. The oil filters are crushed while being washed in a water bath containing a carefully limited amount of surfactant and with minimal agitation. The amount of surfactant in the wash water is carefully controlled to inhibit the emulsification of the oil. Agitation of the wash water is also limited to reduce the amount of oil emulsified by the mechanical effects of agitation. The oil is recovered and the wash water is recycled. Any solids or other debris recovered from the filters is also collected for proper disposal. The cleaned, crushed oil filters are a suitable raw material for further reprocessing into steel.

It is, therefore, a primary object of this invention to provide improvements in the process for cleaning used oil filters.

Another object of this invention is to provide a process for cleaning used oil filters wherein the oil is recoverable and the water is recyclable.

Another object of this invention is to provide a cleaning process for cleaning used oil filters wherein the wash water contains a carefully limited amount of surfactant to preclude emulsification of the oil from the used oil filters.

Another object of this invention is to provide a process for crushing the used oil filter while simultaneously cleaning the used oil filters so that the oil filters cleaned thereby can be recycled into steel.

These and other objects and features of the present invention will become more readily apparent from the following description in which preferred and other embodiments of the invention have been set forth in conjunction with the accompanying drawing and appended claims.

BRIEF DESCRIPTION OF THE DRAWING

The drawing is a schematic flow diagram of the novel process of this invention.

DETAILED DESCRIPTION OF THE PREFERRED EMBODIMENT

The invention is best understood by reference to the drawing wherein like parts are designated by like numerals throughout in conjunction with the following description.

General Discussion

This novel invention is a water-based process for cleaning used oil filters to remove and recover a substantial portion of the residual oil while at the same time reducing emulsification of the oil which would otherwise contaminate the wash water. Silt, sand, and other insoluble materials are also recovered in an essentially oil-free state for ease of disposal. Importantly, the amount of surfactant in the wash water is carefully restricted to effectively eliminate emulsification of the oil. Further, agitation of the wash water is also minimized to reduce the mechanical emulsification of the oil.

The selection of the appropriate surfactant in the water wash step of this process is critical to the success of the process. The wrong surfactant can emulsify residual oil leaving a highly contaminated water having oil and any dirt, etc., dispersed throughout. Importantly, the surfactant or surface active agent must be able to remove oil from the oil filter without simultaneously emulsifying the oil into the water phase. Additional surfactant requirements include its being nontoxic to plant growth so that minute quantities of residual surfactant entrained in the sand/silt residues will permit these residues to be discarded in an ecologically sound manner. A further feature is that the surfactant must be biodegradable and the degradation products must not be toxic to plant life for the reasons stated hereinbefore.

Surfactants can be categorized in three general categories: Cationic, Anionic, and Nonionic. I have discovered that a very narrow range of nonionic surfactants provides the necessary characteristics that make this process feasible.

Table I outlines my discovery that a surfactant selected from primary or linear alcohols of the ethoxylate family with a narrow range of carbon atoms in the primary alcohol chain provides optimal separation. The number of ethoxy groups on the carbon atoms in the chain are also selected within a relatively narrow range since the greater the number of ethoxy groups on the surfactant molecule, the more soluble the oil will be in water. This must be balanced with the fact that the higher number of ethoxy groups causes an increased rate of disengagement of the oil from the filters. Correspondingly, the lower range of carbon atoms in the surfactant provides a faster release of oil. For example a surfactant with eight carbon atoms results in a very fast release of oil much faster than a surfactant with 12 or 15 carbon atoms. However, an undesirable feature is that surfactants of this type also form emulsions between the released oil and the wash water, an event that must be avoided in order to make this process economically feasible.

Another important limitation is the amount of the surfactant in the water phase. For example, a surfactant of this invention having eight carbon atoms and three ethoxy groups in a concentration range of three to four percent will produce a complete emulsion. I have found that the maximum allowable concentration of surfactant suitable for the practice of this invention must not exceed about one-half percent, by volume. This must be carefully monitored during the recycle of the water so that the makeup stream of surfactant does not contain excess surfactant. This is important since a certain fraction of surfactant will be lost with the oil phase and some will be carried away by the silt-residue.

The conclusion to be derived from an analysis of the results displayed in Table I is that the two to three ethoxylate units provide a superior surface active agent as long as possible clay floaters in the silt residue do not present interface separation problems during continuous processing. The advantage of this surfactant range is that there is no water contamination problem.

Ethoxylate units in the six to eight range present clean interfaces but requires at least ten minutes settling time before the water can be reused. This time requirement may or may not adversely affect the continuous processing strategy. Greater than eleven ethoxylate units renders the surfactant unusable.

Another study was conducted to determine the rate at which the oil separates from the filter during the water-wash cycle. Comparisons were made using alcohols with eight, twelve and fifteen carbon atoms, C-8, C-12, and C-15, respectively, and with ethoxylate units ranging between three and eight. The studies found that the C-12 and C-15 alcohols were identical with both three and seven ethoxylate units, the seven ethoxylate units being faster. Surprisingly, the C-8 alcohol produced the fastest and cleanest separation with the greater number of ethoxylate units. The results of this study are summarized in Table II.

TABLE I

Behavior of Nonionic Primary Alcohol Ethoxylates (E.O. Units) with Varying Surfactant Concentrations

| | | |
|---|---|---|
| 2 E.O. Units regardless of concentration | The water layer clear, no color | Lots of clay floaters at both interfaces |
| 3 E.O. Units regardless of concentration | Same as above | Same as above |
| 6 E.O. Units | | |
| .5% | Water layer light brown | Settles out, few clay floaters[1] |
| .3% | Water layer colorless | Settles out, few clay floaters[1] |
| 7 E.O Units | | |
| .5% | Water layer light brown | Very few clay floaters[1] |
| .3% | Water layer colorless | Very few clay floaters[1] |
| 8 E.O. Units | | |
| .5% | Water layer light black | At end of 10 minutes no clay floaters[2] |
| .3% | Water layer dark brown | At end of 10 minutes no clay floaters[2] |
| 11 E.O. Units | Water layer is black-black, with no observed change within one hour | Too dark to tell |

[1] Settled out leaving a clear solution within 5 minutes settling time.
[2] The black layer in the water contains oil and clay. A layer of fine, tan clay settles out as the solution clears up. This clearing takes place within 10 minutes.

In conclusion, the C-8 alcohol with six to eight ethoxylate units appears to be the ideal surface active agent for this process. This surfactant gave the best rate of recovery, a clean separation of phases with no clinging oil in the oil/water interface. Additionally, this surfactant gave the highest percentage of oil recovery with the least number of process steps. However, great care must be taken to assure that even this surface active agent is maintained at less than 0.5 percent, by volume, since even at three percent, by volume, this surfactant produces a complete emulsion.

The action involved with this surfactant appears to be the displacement or phase disengagement of the oil from the filter with the water/surfactant solution.

TABLE II

Comparison of Carbon Atoms in Alcohol Chain Length with Number of Ethoxylate Units

| Alcohol Chain | Ethoxylate Units | Results | % of oil left on filter after 1 minute surfactant wash |
|---|---|---|---|
| C-8 | 6 | Very large oil drops (¼ in.) Separation complete in 30 seconds | 14% |
| C-8 | 8 | Very large oil drops (¼ in.) Separation complete in 30 seconds | 18% |
| C-15 | 7 | Oil drops (⅛ in.) work way out for 4–5 minutes | 33% |
| C-15 | 3 | Oil drops (⅛ in.) without agitation still coming out after 10 minutes | 36% |

Used oil filters are collected from automobile repair shops although most are generally obtained from high volume, specialty lubrication centers. Historically, the used oil filters are simply punctured and then allowed to drain to remove as much residual oil as possible. For example, in the State of Utah the current requirement is only that the used oil filter must be punctured with at least two holes and drained for a given period of time prior to being discarded. California has a more stringent law effectively barring the disposal of used oil filters in the normal refuse stream. Even metals recyclers reject used oil filters due to the excessive amounts of residual oil coupled with the fact that the filter media tends to clog the air pollution control equipment.

With the novel process of this invention the used oil filters are collected and transported to the cleaning facility where they are cleaned. The cleaning process involves crushing the oil filters while at the same time immersing the oil filters in a tank into which water containing a surfactant has been added. The surfactant lifts the residual oil from the oil filter to enable the water to float the oil away. Crushing the oil filter destroys the integrity of the outer housing exposing the internal filter media to the washing action of the water/surfactant wash water. Importantly, both the amount of surfactant and type of surfactant are very carefully controlled to minimize emulsification of the oil.

Most of the equipment associated with this process strategy is used to separate the recovered oil from the wash water and to recycle the wash water. Residual silt, sand, and other insoluble debris is also recovered in a relatively oil-free state for ease of disposal. The oil filters are placed in the cleaning tank and crushed prior to being held there for a predetermined period of time after which they are removed as cleaned, crushed oil filters. The wash water and resultant oil layer are drawn off the cleaning tank and placed in a settling tank to further assist in the separation of the oil from the wash water. The wash water is recycled and amended with additional water as required while any additional surfactant is added as necessary to compensate for losses and to assure that the surfactant concentration remains within the carefully controlled parameters.

Detailed Description

Referring now to the drawing, one presently preferred process for practicing the novel process of this invention is shown generally at 10 and includes a cleaning tank 12, a crusher 40, a settling tank 14, a recycle pump 16, makeup water line 18, surfactant tank 20, along with other support equipment that will be described hereinafter.

The oil filters are designated generally at 30 with the used oil filter being shown at 30a, the crushed oil filter at 30b and the clean, crushed oil filter at 30c. Only one oil filter 30 is shown herein being processed according to my novel invention, although it is to be clearly understood that hundreds if not thousands of oil filters 30 would be processed simultaneously through this invention.

Cleaning tank 12 is filled with wash water 22 containing the predetermined quantity of surfactant 20 therein. Dirty oil filter 30a containing a residual oil 24 (not shown) is placed in crusher 40 in cleaning tank 12 and crushed while being washed for a sufficient period of time to allow surfactant 20 to lift the oil 24 from oil filter 30b. Oil 24 and used wash water 22 are drawn off cleaning tank 12 through line 28 into settling tank 14. Oil 24 rises to the top of settling tank 14 and is drawn off while a sludge 26 settles to the bottom and is periodically removed.

Cleaned and crushed oil filter 30c is removed from cleaning tank 12 and forwarded to the customary recycling stream (not shown) where it can be reprocessed into steel. Importantly, the residual oil 24 and any sludge 26 has been removed from oil filter 30c so that these potential sources of pollution are eliminated before oil filter 30c is reprocessed by recycling.

The following examples are illustrative of the novel process of my invention and are not to be interpreted as restrictive of the scope of my invention. All the tests were run on used oil filters. Filters of the same type and number were used for each test. Each of these filters had a hole punched in the top, plus a hole punched in the side. They were all drained for at least 24 hours before they were subjected to my novel cleaning process.

Test #1 Washed Filter vs. Unwashed Filter

A filter was washed with a non-ionic surfactant, an alcohol ethoxylate, which consisted of an 8-carbon chain alcohol with 6 ethylene oxide groups attached. The concentration of the surfactant was 0.1% by weight. The solution was introduced through the center hole in the filter at 40 psi at a rate of 1 gal per minute. The recovered liquid, which included the wash solution plus oil, exited through the punched top and side holes as well as the regular small holes around the base of the filter. The filter was subjected to this wash cycle for 2 minutes. The filter was then dissected. No visible oil remained on metal parts and the paper filter inside the metal canister looked clean, with no visible oil. After 3 months a portion of this filter placed on a white filter paper did not stain the filter paper. This indicated that the filter was no longer saturated with oil; therefore, it would not seep out with time. The unwashed filter, on the other hand, was still seeping oil after 3 months. Surprisingly, I discovered that if one were to crush the washed filter under about 30,000 psi pressure, free oil could be squeezed from the filter. This was particularly surprising in that no residual oil was apparent when the cleaned filter media was removed and placed on clean, white filter paper.

Test #2 Affect of Surfactant (81-6) Concentration on Emulsification of Oil and Water It is desirable that the water layer does not contain a water-oil emulsion so that it can be recycled.

Run #1 A used oil filter was soaked in 1.5% surfactant with no mixing. Some free oil came out of the filter. Upon standing this free oil gradually formed a yellowish-white, grease-like emulsion. All metal surfaces, inside and outside of the filter, were covered with this grease-like material. This was not a satisfactory process for cleaning filters.

Run #2 Oil filters were washed under 40 psi pressure at 1 gallon per minute, with 0.5% (81-8) surfactant (8 carbon units and 8 ethylene oxide groups). Free oil was observed being washed from the filter, but this free oil did not collect on the surface. The solution, after washing several filters, became gray with the colloidal oil emulsion that was formed. This emulsion did not break after standing for 2 weeks.

Run #3 This third run was a repeat of Run #2, except the surfactant was changed to the least active surfactant 15-3 (15 units hydrocarbon alcohol with 3 ethylene oxide units attached). The results were the same as for Run #2. This indicates that, for motor oil which contains detergents, the level of surfactant needs to be lower than that used with normal oils and tar sand separations.

Run #4 The fourth run was a repeat of Run #3, except an intermediate surfactant 81-6 was used (8 units hydrocarbon with 6 ethylene oxide groups), and its concentration was reduced to 0.2%. Free oil formed on top of the water layer and could be removed with an oil-water separator. However, the water layer still contained some emulsified oil.

Run #5 The fifth run was a repeat of Run #4 with surfactant concentration reduced to 0.1%. At this concentration the oil-water mix was run through an oil-water separator so that no oil went through the pump. The water solution remained clear and reusable on a continuous basis. Therefore, it was concluded that 0.1% surfactant or under was in the usable region.

For an oil filter to be recycled to recover the steel, the filter has to be in a crushed form. Crushing takes place at a pressure of 20,000 to 30,000 lbs. If a used oil filter is crushed after it is washed, oil is emitted from the filter; therefore, one is no better off for recycling than if the filter is just crushed.

Also, it is impossible to wash the filter after it is crushed. Therefore, it is my novel concept that the used oil filter needs to washed while the filter is being crushed. This simultaneous wash and crush step removes significantly more oil than crushing alone. The crushed-washed filter will be more acceptable for recycling. It has been found that a crushed filter and a crushed-washed filter of the same type and beginning weight, will have the same weight after they are crushed. The difference is that the liquid in the crushed filter is oil, whereas in the washed-crushed filter the liquid is about half water. On a well-drained filter, crushing will remove from 65 to 75% of the oil. A well-drained filter that is washed as it is being crushed will remove an additional 10-20%, or 85-90% of the oil.

The oil that remained in the filter was determined by removing a weighted fraction of the filter, extracting the oil with a light organic solvent, evaporating the solvent, and measuring the weight of the residue oil.

EXAMPLE 1

| Medium Filter (Automobile) Crushing only (30,000 lbs) | |
|---|---|
| Weight of filter | 390 grams |
| Weight of filter after crushing | 319 grams |
| Weight of oil removed | 71 grams |
| Grams of oil remaining | 28 grams |
| % Oil remaining in filter | 41% |

Comment: Bottom of filter was covered with oil and was leaking oil, and it continued to leak oil for over three weeks.

EXAMPLE 2

| Medium Filter (Automobile) Crushed (30,000 lbs) while being washed (90 psi and at 1 gal per minute with .05% 81.6 solution) | |
|---|---|
| Weight of filter | 400 grams |
| Weight after crushing and washing | 323 grams |
| Weight after being dried at 110° C. | 302 grams |

-continued

| Medium Filter (Automobile) Crushed (30,000 lbs) while being washed (90 psi and at 1 gal per minute with .05% 81.6 solution) | |
|---|---|
| Weight of oil removed | 98 grams |
| Grams of oil remaining | 14 grams |
| % Oil remaining in filter | 24% |
| % Removal | 87% |

Comment: All metal surfaces were free of oil. Small amount of oil and water dripped from filter immediately after washing-crushing. There was no leakage after one day.

EXAMPLE 3

| Large Filter (Automobile) Crushed only (30,000 psi) | |
|---|---|
| Weight before crushing | 510 grams |
| Weight after crushing | 438 grams |
| Weight of oil removed | 72 grams |
| Grams of oil left in filter | 31 grams |
| % Oil remaining in filter | 43% |
| % Oil removed | 87% |

EXAMPLE 4

| Large Filter (Automobile) Crushed at 30,000 psi while being washed (90 psi and at 1 gal per minute with .05% 81.6 solution) | |
|---|---|
| Original weight | 515 grams |
| Weight after crushing and washing | 425 grams |
| Weight after drying at 115° C. | 410 grams |
| Weight of oil left in filter | 14 grams |
| % Original oil left in filter | 13% |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A process for removing residual oil from a used oil filter comprising the steps of:
    obtaining a used oil filter having residual oil therein;
    preparing a wash water comprising a surfactant to remove said residual oil, said surfactant comprising less than about 0.5% by volume of said surfactant to inhibit emulsification of said residual oil; and
    simultaneously crushing and washing said used oil filter thereby removing an increased quantity of said residual oil than by either washing said used oil filter with said wash water only or crushing said used oil filter only.

2. The process defined in claim 1 wherein said preparing step comprises adding a surfactant to said wash water, said surfactant comprising a linear alcohol having carbon atoms within the range on the order of about eight to fifteen carbon atoms and ethoxylate units on the carbon atoms within the range on the order of about two to eight ethoxylate units, said surfactant being present in said water in an effective amount less than about 0.5 percent, by volume, to inhibit the emulsification of said residual oil.

3. The process defined in claim 1 wherein said crushing step comprises separating said residual oil from said wash water.

4. The process defined in claim 3 wherein said separating step comprises recirculating said wash water.

5. The process defined in claim 4 wherein said recirculating step comprises adding an additional quantity of said surfactant to said wash water to maintain said effective amount of said surfactant in said wash water to inhibit emulsification of said residual oil.

6. A process for cleaning used oil filters comprising the steps of:

obtaining oil filters contaminated with residual oil;

preparing a wash water containing an effective amount of surfactant to remove said residual oil, said effective amount inhibiting emulsification of said residual oil;

simultaneously crushing and washing said oil filters with said wash water thereby removing an increased quantity of said residual oil from said oil filter than if washed with said wash water and if said oil filters are only crushed in the absence of simultaneously washing with said wash water;

separating said residual oil from said wash water; and recirculating said wash water.

7. The process defined in claim 6 wherein said preparing step comprises selecting said surfactant from a surfactant operable to remove said residual oil from said oil filters while limiting said surfactant in said wash water and thereby inhibiting emulsification of said residual oil into said wash water, said surfactant comprising a carefully selected nonanionic surfactant which has been added to said wash water in an effective amount less than about 0.5 percent, by volume, said effective amount of said surfactant inhibiting the emulsification of said residual oil, said surfactant comprising a linear alcohol having carbon atoms within the range on the order of about eight to fifteen carbon atoms and ethoxylate groups within the range on the order of about two to eight ethoxylate groups.

8. The process defined in claim 7 wherein said selecting step comprises choosing a surfactant comprising a surfactant having eight carbon units and eight ethylene oxide groups.

9. The process defined in claim 7 comprising adding an additional quantity of said surfactant and water to said wash water to maintain said effective amount of said surfactant in said wash water during said recirculating step, said effective amount removing said residual oil while inhibiting emulsification of said residual oil.

10. The process defined in claim 6 wherein said washing step comprises limiting agitation of said wash water thereby reducing mechanically emulsification of said residual oil into said wash water.

11. The process defined in claim 6 wherein said separating step comprises recovering said residual oil.

12. A process for cleaning residual oil from used oil filters comprising the steps of:

obtaining used oil filters contaminated with residual oil;

selecting a surfactant operable to remove said residual oil from said used oil filters;

preparing a wash water by adding said surfactant to water;

inhibiting emulsification of said residual oil into said wash water by limiting the quantity of said surfactant in said wash water; and simultaneously crushing and washing said used oil filters with said wash water, said wash water removing said residual oil from said used oil filters.

13. The process defined in claim 12 wherein said selecting step comprises choosing a surfactant comprising a carefully selected, nonanionic surface active agent, said surface active agent being present in an effective amount less than about 0.5, by volume, said effective amount inhibiting emulsification of said residual oil, said surfactant comprising a linear alcohol having carbon atoms within the range on the order of about eight to fifteen carbon atoms and ethoxylate groups within the range on the order of about two to eight ethoxylate groups.

14. The process defined in claim 12 wherein said washing step comprises separating said residual oil from said wash water and recirculating said wash water.

15. The process defined in claim 14 wherein recirculating step comprises adding an additional quantity of said surfactant to said wash water to maintain said effective amount of said surfactant in said wash water.

* * * * *